United States Patent [19]
Foell et al.

[11] 3,928,307
[45] Dec. 23, 1975

[54] P-GLU-D-PHE-TRP-SER-TYR-D-PHEE-LEU-ARG-PRO-GLY-NH2 AND INTERMEDIATES

[75] Inventors: Theodore J. Foell; John P. Yardley, both of King of Prussia, Pa.

[73] Assignee: American Home Products Corporation, New York, N.Y.

[22] Filed: Nov. 4, 1974

[21] Appl. No.: 520,382

[52] U.S. Cl. .................. 260/112.5 LH; 424/177
[51] Int. Cl.² ................ C07C 103/52; A61K 37/00
[58] Field of Search ........................... 260/112.5

[56] References Cited
UNITED STATES PATENTS 3,855,199  12/1974  Foell et al. .................. 260/112.5

*Primary Examiner*—Lewis Gotts
*Assistant Examiner*—Reginald J. Suyat

[57] ABSTRACT

D-$Phe^2$-D-$Phe^6$-LRF, is described as well as its synthesis by solid phase techniques and novel intermediates formed by such synthesis. The novel decapeptide exhibits anti-ovulatory activity in mammals.

8 Claims, No Drawings

P-GLU-D-PHE-TRP-SER-TYR-D-PHEE-LEU-ARG-PRO-GLY-NH2 AND INTERMEDIATES

This invention relates to the novel decapeptide p-Glu-D-Phe-Trp-Ser-Tyr-D-Phe-Leu-Arg-Pro-Gly-NH$_2$, its process of manufacture and novel intermediates formed in such synthesis.

The luteinizing hormone releasing factor (hereafter called LRF) is the decapeptide, L-(5-oxoprolyl)-L-histidyl-L-tryptophyl-L-seryl-L-tyrosyl-glycyl-L-leucyl-L-arginyl-L-prolylglycineamide. This decapeptide is secreted by the hypothalamus and carried to the adenohypophysis where it stimulates the release of the luteinizing hormone and the follicle stimulating hormone. In (i) copending application Ser. No. 402,958 filed Oct. 3, 1973, now U.S. Pat. No. 3,855,199, D-Phe$^2$-D-Ala$^6$-LRF is described and claimed as having antiovulatory activity; (ii) copending application Ser. No. 417,983 filed Nov. 21, 1973 now U.S. Pat. No. 3,886,137 D-Phe$^2$-D-Leu$^6$ is described and claimed as having anti-ovulatory activity and (iii) copending application Ser. No. 459,513 filed Apr. 10, 1974, now U.S. Pat. No. 3,886,135, D-Phe$^2$-D-Pgl$^6$-LRF is described and claimed as having anti-ovulatory activity. U.S. Pat. No. 3,824,227 describes D-Phe$^2$-LRF as an antagonist of LRF in vitro. Other modifications of LRF are described by Fujino et al., Biochemical and Biophysical Research Communications, 49, No. 3 pp 698–705 (Nov. 1972).

The present invention concerns itself with further structural modifications of LRF which exhibit anti-ovulatory activity.

The novel peptides of the present invention are represented by the compounds of the formula:

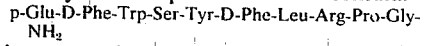

and its non-toxic salts. All chiral amino acid residues identified in formula I supra, and the other formulas hereinafter are of the natural or L-configuration unless specified otherwise.

Also contemplated within the scope of the present invention are intermediates of the formula

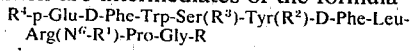

wherein:

R is selected from the class consisting of NH$_2$, OH, O-(lower)alkyl, in which (lower)alkyl is C$_1$ through C$_6$ (e.g. methyl, ethyl, pentyl, hexyl, etc.) and O-benzyl;

N$^G$ means the side chain nitrogen atoms of arginine; R$^1$ is a protecting group for the N$^\delta$, N$^\omega$ and N$^{\omega'}$ nitrogen atoms of arginine selected from the class consisting of nitro, tosyl, benzyloxycarbonyl, adamantyloxycarbonyl and tert-butyloxycarbonyl; or R$^1$ is hydrogen which means there are no protecting groups on the side chain nitrogen atoms of arginine. Where the protecting group is nitro or tosyl, the protection is on either one of the N$^\omega$, N$^{\omega'}$ nitrogens and in the case of benzyloxycarbonyl, or adamantyloxycarbonyl, the protection is on the N$^\delta$ nitrogen and either one of the N$^\omega$, N$^{\omega'}$ nitrogen atoms. The preferred protecting group defined by R$^1$ is tosyl;

R$^2$ is a protecting group for the phenolic hydroxyl group of tyrosine selected from the class consisting of tetrahydropyranyl, tert-butyl, trityl, benzyl, 2,6-dichlorobenzyl, benzyloxycarbonyl and 4-bromobenzyloxycarbonyl. The preferred protecting group is benzyl; or R$^2$ is hydrogen which means there is no protecting group on the phenolic hydroxy function;

R$^3$ is a protecting group for the alcoholic hydroxyl group of serine and is selected from the class consisting of acetyl, benzoyl, tetrahydropyranyl, tert-butyl, trityl, benzyl, 2,6-dichlorobenzyl, or R$^3$ is hydrogen which means there is no protecting group on the alcoholic oxygen atom. Preferably R$^3$ is benzyl;

R$^4$ is preferably hydrogen or an α-amino protecting group. The α-amino protecting group contemplated by R$^4$ are those known to be useful in the art in the step-wise synthesis of polypeptides. Among the classes of α-amino protecting groups covered by R$^4$ are (1) acyl type protecting groups illustrated by the following: formyl, trifluoroacetyl, phthalyl, toluenesulfonyl (tosyl), benzensulfonyl, nitrophenylsulfenyl, tritylsulfenyl, o-nitrophenoxyacetyl, chloroacetyl, acetyl, γ-chlorobutyryl, etc.; (2) aromatic urethan type protecting groups illustrated by benzyloxycarbonyl and substituted benzyloxycarbonyl such as p-chlorobenzyloxycarbonyl, p-nitrobenzyloxycarbonyl, p-bromobenzyloxycarbonyl, p-methoxybenzyloxycarbonyl; (3) aliphatic urethan protecting groups illustrated by tert-butyloxycarbonyl, diisopropylmethoxycarbonyl, isopropyloxycarbonyl, ethoxycarbonyl, allyloxycarbonyl; (4) cycloalkyl urethan type protecting groups illustrated by cyclopentyloxycarbonyl, adamantyloxycarbonyl, cyclohexyloxycarbonyl; (5) thio urethan type protecting groups such as phenylthiocarbonyl; (6) alkyl type protecting groups as illustrated by triphenylmethyl (trityl), benzyl; (7) trialkylsilane groups such as trimethylsilane. The preferred α-amino protecting group defined by R$^4$ are selected from the class consisting of tert-butyloxycarbonyl, cyclopentyloxycarbonyl, tert-amyloxycarbonyl and d-isobornylcarbonyl.

In formula II at least one of R$^1$, R$^2$ or R$^3$ is a protecting group.

A further aspect of the present invention relates to intermediates linked to a solid resin support. These intermediates are represented by the formula:

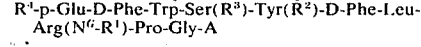

wherein:

R$^1$, R$^2$, R$^3$ and R$^4$ have the same meaning as in Formula II; "A" is an anchoring bond used in solid phase synthesis linked to a solid resin support. "A" is selected from the class consisting of:

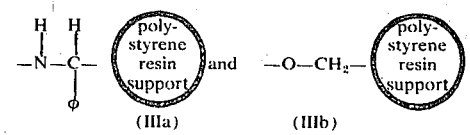

The symbol φ means "phenyl". The polystyrene resin support is preferably a copolymer of styrene with about 1 to 2% divinyl benzene as a cross linking agent which causes the polystyrene polymer to be completely insoluble in most organic solvents. The polystyrene polymer is composed of long alkyl chains bearing a phenyl ring on every second carbon and the terminal amino acid residue (Gly) is joined through a covalent carbon to nitrogen or oxygen bond to these phenyl rings. The alkyl chains are cross linked at approximately every fiftieth carbon by p-substituted phenyl residues derived from divinyl benzene.

In selecting a particular side chain protecting group to be used in the synthesis of the peptides of formula (I), the following rules should be followed: (a) the protecting group must be stable to the reagent and under the reaction conditions selected for removing the α-amino protecting group at each step of the synthesis, (b) the protecting group must retain its protecting properties (i.e. not be split off under coupling conditions), and (c) the side chain protecting group must be removable upon the completion of the -ocoprolyl)-L-histidyl-L-tryptophyl-L-seryl-L-tyrosyl-glycyl-L-leucyl-L-arginyl-L-prolylglycineamide. containing the desired amino acid sequence under reaction conditions that will not alter the peptide chain.

Illustrative of pharmaceutically acceptable non-toxic salts of formula I are hydrochloride, hydrobromide, sulfate, phosphate, maleate, acetate, citrate, benzoate, succinate, malate, ascorbate, and the like.

The peptides of formula (I) through (III) are prepared using solid phase synthesis. The synthesis is commenced from the C-terminal end of the peptide using an α-amino protected resin. Such a starting material can be prepared by attaching an α-amino protecting glycine to a benzhydrilamine resin, a chloromethylated resin or a hydroxymethyl resin, the former being preferred. The preparation of a benzhydrilamine resin is described by P. Rivaille et al., Helv. 54, 2772 (1971) and the preparation of the hydroxymethyl resin is described by Bodanszky et al., Chem. Ind (London) 38, 1597–98 (1966). A chloromethylated resin is commercially available from Bio Rad Laboratories Richmond, California and the preparation of such a resin is described by Stewart et al., "Solid Phase Peptide Synthesis" (Freeman & Co. San Francisco 1969), Chapter 1, pp 1–6. In using the benzhydrilamine resin an amide anchoring bond is formed with the α-amino protected glycine as follows:

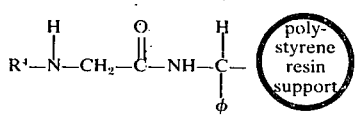

This permits the C-terminal amide function to be obtained directly after the amino acid sequence in the synthesis is complete by cleaving off the resin support to form the glycine amide at the C-terminal portion of the desired peptide of formula (I). When the other resins are used, the anchoring bond is the benzylester group as defined supra in Formula (IIIb), which after cleavage of the peptide from the resin support must be converted to the C-terminal amide. The preferred procedure is to ammonalyse the protected peptide off the resin and then remove the protecting group by hydrogenolysis or by hydrogen fluoride cleavage. An alternate procedure would be to cleave by transesterification with methanol/(Et)$_3$N and then convert the resulting ester into an amide and subsequently deprotect as described above. See J. M. Stewart "Solid Phase Peptide Synthesis", pp 42–46 (W. H. Freeman & Co. 1968).

The α-amino protected glycine is coupled to the benzhydrilamine resin with the aid of a carboxyl group activating compound such as dicyclohexylcarbodiimide. Following the coupling of the α-amino protected glycine to the resin support, the α-amino protecting group is removed such as by using trifluoroacetic acid in methylene chloride, trifluoroacetic acid alone or HCl in dioxane. The deprotection is carried out at a temperature between about 0°C and room temperature. Other standard cleaving reagents and conditions for removal of specific α-amino protecting groups may be used as described in Schroder & Lubke, "The Peptides", 1 72–75 (Academic Press 1965). After removal of the α-amino protecting group the remaining α-amino protected amino acids are coupled step-wise in the desired order to obtain a compound of formula (I). However, as an alternate to adding each amino acid separately to the reaction, some of them may be coupled prior to addition to the solid phase reactor. If the C-terminal end of the peptide unit is represented by glycine or proline and the coupling is carried out with DCC, a minimum of racemization is encountered with proline and no problems are encountered with glycine which has no asymmetric centre. Each protected amino acid or amino acid sequence, is introduced into the solid phase reactor in about a four-fold excess and the coupling is carried out in a medium of dimethylformamide: methylene chloride (1:1) or in dimethylformamide or methylene chloride alone. In cases where incomplete coupling occurred the coupling procedure is repeated before removal of the α-amino protecting group, prior to the coupling of the next amino acid to the solid phase reactor. The success of the coupling reaction at each stage of the synthesis is monitored by the ninhydrin reaction as described by E. Kaiser et al., Analyt. Biochem, 34, 595 (1970).

After the desired amino acid sequence has been synthesized, the peptide is removed from the resin support by treatment with a reagent such as hydrogen fluoride which not only cleaves the peptide from the resin but also cleaves all remaining side chain protecting groups and the α-amino protecting group (if present) on pyroglutamic acid to obtain directly a compound of formula I in the case where the benzhydrilamine resin was used. Where a chloromethylated resin is used the peptide may be separated from the resin by methanolysis after which the recovered product is chromatographed on silica gel and the collected fraction subject to ammonalysis to convert the methyl ester to the C-terminal amide. Any side chain protecting group may then be cleaved as previously described or by other procedures such as catalytic reduction (e.g. Pd on C) using conditions which will keep the Trp moiety intact. When using hydrogen fluoride for cleaving, anisole is included in the reaction vessel to prevent the oxidation of labile amino acid (e.g. tryptophan).

The solid phase synthesis procedure discussed supra is well known in the art and has been essentially described by M. Monahan et al., C.R. Acad. Sci. Paris, 273 508 (1971).

The nomenclature used for peptides is described by Schroder & Lubke, supra, pp viii–xxix and in Biochemistry 11, 1726–1732 (1972).

The following examples are illustrative of the preparation of the compounds of formulas I through III.

EXAMPLE 1

L-Pyroglutamyl-D-phenylalanyl-L-tryptophyl-O-benzyl-L-seryl-O-2,6-dichlorobenzyl-L-tyrosyl-D-phenylalanyl-L-leucyl-$N^a$-tosyl-L-arginyl-L-prolylglycyl benzhydrilamine resin Benzhydrilamine resin (20.0 g.) is put in a Merrifield vessel of 300 ml. capacity and put through the following wash cycle: (a) methylene chloride; (b) trifluoroacetic acid (3 times for 10 minutes each); (c) methylene chloride; (d) methanol; (e) triethylamine 12.5% in dimethylformamide (2 times for 10 minutes each); (f) methanol (two times); (g) methylene chloride (two times), allowing a contact time of at least 3 minutes each, if not indicated otherwise.

The resin so prepared is then gently shaken with t-butyloxycarbonyl glycine (3.65 g., 21 mmole) in 1:1 methylene chloride-dimethylformamide and 25.6 ml. of 1M dicyclohexylcarbodiimide in methylene chloride is added in three portions over a period of thirty minutes. Shaking is continued at ambient temperature for a total of 18 hours. The peptide-resin is then washed successively with methanol, methylene chloride, methanol (twice), and methylene chloride (twice). To test for completeness of reaction, the peptide-resin is subjected to a ninhydrin test following the procedure of E. Kaiser et al., Analytical Biochemistry 34, 595 (1970).

The deprotection of the attached amino acid is carried out as follows: The peptide-resin is treated with a 1:1 solution of trifluoroacetic acid-methylene chloride (three times for 15 minutes each), then steps (c) through (g), as described above for the wash cycle are performed. Again, a sample of the peptide-resin is subjected to a ninhydrin test to check for completeness of reaction. The sample is now strongly positive indicating deprotection of the glycine molecule attached to the resin.

The following amino acid residues are then introduced consecutively: t-Boc-L-proline (21 mmoles, 25.6 mmoles DCC), t-Boc-$N^a$-tosyl-L-arginine (21 mmoles, 25.6 mmoles DCC), t-Boc-L-leucine (21 mmoles, 25.6 mmoles DCC). Each coupling step is carried out in a medium of methylene chloride-dimethylformamide (1:1) and the removal of the α-amino protecting group at each step is performed as described for the deprotection of the t-Boc-glycine-resin.

At this point, the washed tetrapeptide-resin is dried, weighed (26.38 g.), and the synthesis is continued with one half (13.19 g.) of the tetrapeptide-resin. The next amino acid added is t-Boc-D-phenylalanine (10.5 mmoles, 12.8 mmoles DCC), t-Boc-O-2,6-dichlorobenzyl-L-tyrosine (10.5 mmoles, 12.8 mmoles DCC), t-Boc-O-benzyl-L-serine (10.5 mmoles, 12.8 mmoles DCC), and t-Boc-L-tryptophan (10.5 mmoles, 12.8 mmoles DCC). The washed peptide-resin is again dried (16.3 g) and the synthesis is continued with 3.26 g. of the peptide-resin. However, after the addition of t-Boc-tryptophan the deprotection reaction is carried out with the addition of 5% 1,2-ethanedithiol added to the trifluoroacetic acid-methylene chloride medium. Next t-Boc-D-phenylalanine (2.08 mmoles, 3 mmoles DCC), is added, then L-2-pyrrolidine-5-carboxylic acid, (3.12 mmoles, 4.5 mmoles DCC). The washed peptide-resin is dried in vacuo.

EXAMPLE 2

L-pyroglutamyl-D-phenylalanyl-L-tryptophyl-L-seryl-L-tyrosyl-D-phenylalanyl-L-leucyl-L-arginyl-L-prolyl-glycinamide Removal of the protecting groups and cleavage of the decapeptide from the resin is accomplished by treating the dried peptide-resin of Example 1 in vacuo with liquid hydrogen fluoride (25 ml.) and anisole (10 ml.) at ice bath temperature for one hour. The hydrogen fluoride is removed by vacuum distillation and the anisole removed by washing with ether. The peptide is dissolved in 10% acetic acid and removed from the resin by filtration. Lyophilization yields the desired decapeptide as a white fluffy powder.

EXAMPLE 3

Purification and characterization of L-pyroglutamyl-D-phenylalanyl-L-tryptophyl-L-seryl-L-tyrosyl-D-phenylalanyl-L-leucyl-L-arginyl-L-prolyl-glycinamide acetate The crude peptide of Example 2 is dissolved in a minimum volume of 0.2N acetic acid, applied to a Bio-Gel P-2 200–400 mesh gel filtration column (2.5 cm × 90 cm) and eluted with the same solvent. Fractions of 9 ml. each are collected. The fractions containing the desired peptide are located by Pauly spot test and UV analysis. After pooling and lyophilization, a white fluffy powder (352 mg.) is obtained.

A partition column of Sephadex G-25 fine (2.5 cm × 90 cm) is prepared by equilibration with lower phase and then upper phase of the BAW solvent system (n-butanol:acetic acid:water, 4:1:5, $V_H$=165 ml.).

The lyophilized peptide from above is applied in a minimum volume of upper phase. Elution with upper phase (6 ml. fractions) affords the desired product which is located as described above. After pooling and lyophilization, a white fluffy powder (281.3 mg.) is obtained.

The lyophilized peptide from above is applied in a minimum volume of 0.2N acetic acid, applied to a Bio-Gel P-2 200–400 mesh gel filtration column (2.5 cm × 90 cm) and eluted with the same solvent. Fractions of 9 ml. each are collected. The fractions containing the desired peptide are located by Pauly spot test and UV analysis. After pooling and lyophilization, a white fluffy powder (95.5 mg.) is obtained.

The optical rotation is measured on a Carl Zeiss LEP A-2 photoelectric precision polarimeter, $[\alpha]_D^{26} = 0.00$ (c=0.277, 5% acetic acid); Amino acid analysis gives the following ratios: Ser (0.84), Glu (0.94), Pro (0.90), Gly (1.00), Leu (0.98), Tyr (0.92), Phe (1.95), $NH_3$ (1.03), Trp (ca.1), Arg (1.17).

The peptide (20 μ load) is homogeneous in three TLC systems (silica plates-Brinkman) when examined under ultraviolet light, iodine vapor, and Pauly reagent: n-butanol:acetic acid: water (4:1:5, upper phase), Rf 0.26; isopropanol:1N ammonium hydroxide (2:1), Rf 0.65; n-butanol:ethyl acetate:acetic acid:water (1:1:1:1), Rf 0.61.

The compounds of formula I possess anti-ovulatory activity and hence are potentially useful in inhibiting fertility in female mammals. In tests conducted with female rats (225 to 250 grams body weight) complete ovulation inhibition was achieved in 80% of the rats tested at a dose of about 24 mg/kg. The test was conducted with mature Sprague-Dawley rats, normally cycling, unanesthetized, proestrous rats. On the afternoon of proestrous, each rat in the test group received six subcutaneous injections of the acetate salt of formula I in corn oil, each injection being given a half hour following the previous injection. The rats are sacrificed the next morning and the number of animals ovulating and the number of ova shed are recorded following the procedure described by E. S. France, Neuroendocrinology 6, pp 77–89 (1970). The absence of or a significant decrease in the number of ova is the criterion for an anti-ovulation effect. At a dose of 1 mg per injection inhibiton of ovulation was achieved in 80% of the rats tested.

The compounds of formula I can be administered to mammals intravenously, subcutaneously, intramuscularly or orally for fertility inhibition and control. The effective dosage will vary with the form of administration and the particular species of mammal to be treated. A typical dosage is a physiological saline solution containing a compound of formula I administered in a dose range of between about 20 to 30 mg/kg of body weight. Oral administration may be in either solid or liquid form.

What is claimed is:

1. A compound selected from the group consisting of
   L-p-Glu-D-Phe-L-Trp-L-Ser-L-Tyr-D-Phe-L-Leu-L-Arg-L-Pro-Gly-NH$_2$ and
   $R^1$-L-p-Glu-D-Phe-L-Trp-L-Ser($R^3$)-L-Tyr($R^2$)-D-Phe-L-Leu-L-Arg-($N^G$-$R^1$)-L-Pro-Gly-R and its non-toxic salts; wherein R is selected from the class consisting of NH$_2$, OH, O-(lower)alkyl and O-benzyl; $R^1$ is selected from the class consisting of hydrogen and a protecting group for the $N^\delta$, $N^\omega$ and $N^{\omega'}$ nitrogen atoms of arginine selected from nitro, tosyl, benzyloxycarbonyl and adamantyloxycarbonyl;

$R^2$ is selected from the class consisting of hydrogen and a protecting group for the phenolic hydroxyl group of tyrosine selected from tert-butyl, tetrahydropyranyl, trityl, benzyl, 2,6-dichlorobenzyl, benzyloxycarbonyl and 4-bromobenzyloxycarbonyl;

$R^3$ is selected from the class consisting of hydrogen and a protecting group for the alcoholic hydroxyl group of serine and is selected from acetyl, benzoyl, tetrahydropyranyl, tert-butyl, trityl, 2,6-dichlorobenzyl, benzyl and benzyloxycarbonyl;

$R^4$ is selected from the class consisting of hydrogen and an α-amino protecting group, with the proviso that at least one of $R^1$, $R^2$ and $R^3$ is a protecting group.

2. A compound according to claim 1 wherein R in NH$_2$.

3. A compound according to claim 1 wherein R is NH$_2$, $R^1$ is tosyl, $R^2$ is 2,6-dichlorobenzyl, $R^3$ is benzyl and $R^4$ is hydrogen.

4. A compound according to claim 1 which is selected from: L-Pyroglutamyl-D-phenylalanyl-L-tryptophyl-L-seryl-L-tyrosyl-D-phenylalanyl-L-leucyl-L-arginyl-L-prolylglycinamide and its non-toxic acid addition salts.

5. A compound of the formula:
   $R^1$-L-p-Glu-D-Phe-L-Trp-L-Ser($R^3$)-L-Tyr($R^2$)-D-Phe-L-Leu-L-Arg-($N^G$-$R^1$)-L-Pro-Gly-A wherein:

$R^1$ is selected from the class consisting of hydrogen and a protecting group for the N , N and N nitrogen atoms of arginine selected from nitro, tosyl, benzyloxycarbonyl and adamantyloxycarbonyl;

$R^2$ is selected from the class consisting of hydrogen and a protecting group for the phenolic hydroxyl group of tyrosine selected from tert-butyl, tetrahydropyranyl, trityl, benzyl, 2,6-dichlorobenzyl, benzyloxycarbonyl and 4-bromobenzyloxycarbonyl;

$R^3$ is selected from the class consisting of hydrogen and a protecting group for the alcoholic hydroxyl group of serine and is selected from acetyl, benzoyl, tetrahydropyranyl, tert-butyl, trityl, 2,6-dichlorobenzyl, benzyl and benzyloxycarbonyl;

$R^4$ is selected from the class consisting of hydrogen and an α-amino protecting group; and A is selected from the class consisting of

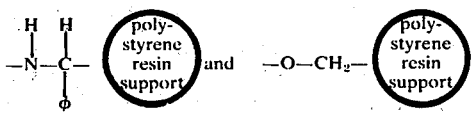

wherein said polystyrene resin is cross linked with divinyl benzene through the phenyl group on each second carbon atom of the alkyl chain of said polystyrene.

6. A compound according to claim 5 wherein $R^4$ is an α-amino protecting group which is selected from the class consisting of tert-butyloxycarbonyl, cyclopentyloxycarbonyl, tert-amyloxycarbonyl and isobornyloxycarbonyl.

7. A compound according to claim 5 wherein A is a benzhydrilamine resin and $R^4$ is hydrogen.

8. A compound according to claim 7 wherein $R^1$ is tosyl, $R^2$ is 2,6-dichlorobenzyl and $R^3$ is benzyl.

* * * * *